United States Patent [19]

Murakami et al.

[11] Patent Number: 4,620,371
[45] Date of Patent: Nov. 4, 1986

[54] WATER-DEPTH MEASURING APPARATUS FOR A DOUBLE BEARING TYPE FISHING REEL

[75] Inventors: Hideo Murakami; Haruo Uetsuki, both of Hiroshima, Japan

[73] Assignee: Ryobi Ltd., Hiroshima, Japan

[21] Appl. No.: 573,652

[22] Filed: Jan. 25, 1984

[30] Foreign Application Priority Data

Jan. 26, 1983 [JP] Japan .............................. 58-10440[U]

[51] Int. Cl.[4] .......................... G01B 3/12; G01B 7/02; A01K 97/00
[52] U.S. Cl. .................................... 33/129; 33/126.5; 242/84.1 M; 242/84.1 R
[58] Field of Search .................... 242/84.1 M, 84.1 K, 242/84.1 R; 116/204; 43/20; 33/126.5, 127, 129, 134 R

[56] References Cited

U.S. PATENT DOCUMENTS

| | | | |
|---|---|---|---|
| 2,752,686 | 7/1956 | Anderson et al. | 33/129 |
| 2,874,477 | 2/1959 | McConnell | 43/20 |
| 3,909,949 | 10/1975 | Miyamae | 33/129 |
| 4,014,422 | 3/1977 | Morishita | 192/67 R |
| 4,373,266 | 2/1983 | Stutz | 33/129 |
| 4,378,652 | 4/1983 | Lindgren | 43/21 |
| 4,438,391 | 3/1984 | Rog et al. | 33/132 R |
| 4,447,955 | 4/1984 | Stutz et al. | 33/129 |

FOREIGN PATENT DOCUMENTS

| | | | |
|---|---|---|---|
| 99676 | 7/1980 | Japan . | |
| 57-15847 | 4/1982 | Japan | 242/84.1 R |
| 57-40788 | 9/1982 | Japan | 242/84.1 R |

Primary Examiner—Charles Frankfort
Assistant Examiner—Thomas B. Will
Attorney, Agent, or Firm—Finnegan, Henderson, Farabow, Garrett & Dunner

[57] ABSTRACT

A water-depth measuring apparatus for a double bearing type fishing reel including a reel body in which a spool carrying a fishing line is rotatably supported. At least one element is provided on the spool for rotation therewith. A case which is separate from the reel body is removably mountable on the reel body, and contains a detector for detecting the rotating speed of the element and generating a corresponding signal, a computer for receiving the signal from the detector and calculating the cast length of the fishing line, a display device for displaying the cast length, a keyboard, a battery and a buzzer. The keyboard carries a power supply ON key, a power supply OFF key, a fishing line size set key, a memory set key and a buzzer OFF key. The detector faces the element and the buzzer sounds when the cast length of the fishing line has reached a certain level.

14 Claims, 6 Drawing Figures

WATER-DEPTH MEASURING APPARATUS FOR A DOUBLE BEARING TYPE FISHING REEL

BACKGROUND OF THE INVENTION

Field of the Invention

This invention relates to a water-depth measuring apparatus for a double bearing type fishing reel. More particularly, it is concerned with an apparatus which enables accurate determination of the length of a fishing line supplied from a spool supported rotatably in a reel body so that the line may be wound on the spool by a handle, and thereby enables the casting of the line to a predetermined depth again.

Description of the Prior Art

A double bearing type fishing reel in which the cast length of a fishing line is indicated is disclosed in published Japanese Utility Model Specification No. 99676/1980. According to this publication, the reel includes a computer provided in a reel body for storing data concerning the number of turns of a fishing line wound on a spool, the size of the line, and the rotation speed of the spool. The reel body is also provided with a setting device which transmits a set signal corresponding to the number of turns and size of the fishing line to the computer.

A detectable element is provided on either the spool or a rotor adapted for rotation with the spool, and a detector for the element is provided on the reel body. The detector detects the rotation speed of the element, and transmits a corresponding signal to the computer. This signal and the set signal cause the computer to produce a signal representing the cast length of the fishing line, so that it may be indicated by an indicator. The entire mechanism for determining the cast length of the fishing line is provided in the reel body, and the cast length is indicated by the indicator. Accordingly, a detector of this type may only be used with the reel into which it is incorporated.

OBJECTS AND SUMMARY OF THE INVENTION

It is an object of the present invention to provide an improved water-depth measuring apparatus.

Another object of the present invention is to alert a fisherman when the length of a cast of a fishing line is approximately equal to the length of a predetermined cast.

A further object of the present invention is a portable water-depth measuring apparatus which may be attached to an existing fishing reel.

Still another object of the present invention is a water-depth measuring apparatus that can visibly display the length of a cast.

Yet another object of the present invention is a water-depth measuring apparatus which enables a fisherman to select a predetermined fishing line cast length and which issues a warning when the length of a cast approaches the predetermined cast length.

These and other objects are accomplished by a cast-length measuring apparatus attachable to a fishing reel including a reel body in which a spool carrying a fishing line is rotatably supported. The apparatus comprises means for detecting the rotation speed of the reel, means for storing reel and line information, means for calculating a cast length of the fishing line from the rotation speed of the element and the reel and line information, and alarm means for indicating when the calculated cast length is equal to a predetermined cast length.

DETAILED DESCRIPTION OF THE PREFERRED EMBODIMENT

Figure 1:
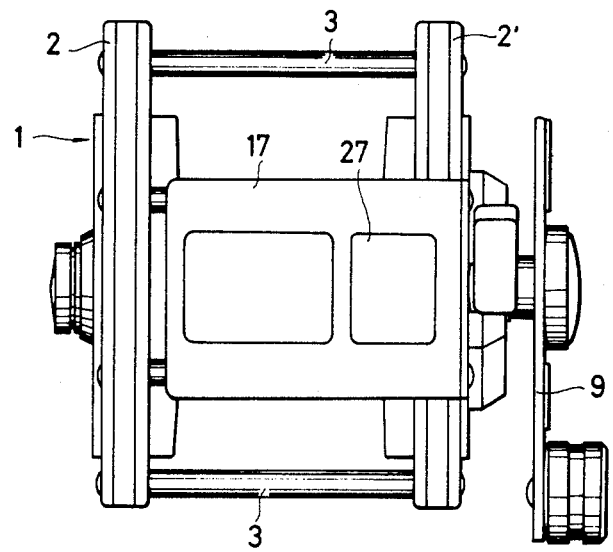
FIG. 1 is a top plan view of a double bearing type fishing reel provided with a water-depth measuring apparatus embodying this invention.
Figure 2:
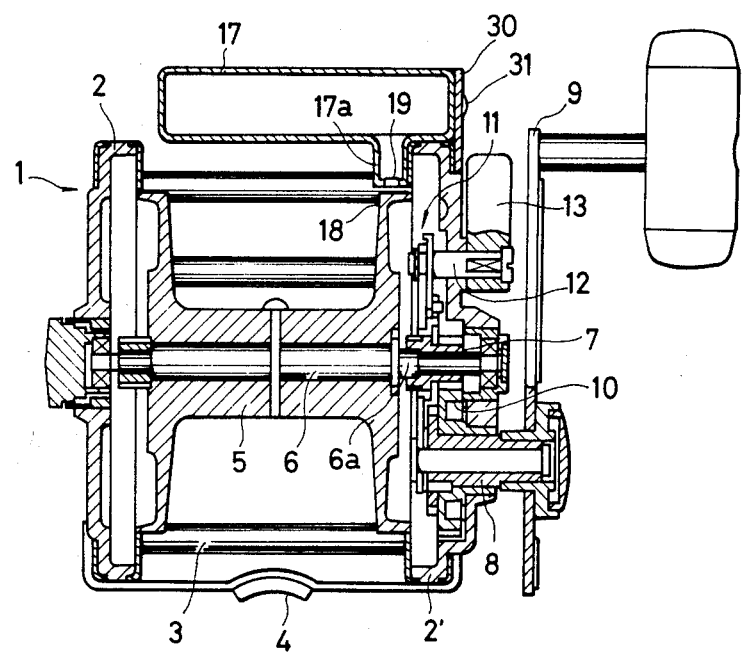
FIG. 2 is a front elevational view, partly in section, of the reel shown in FIG. 1.
Figure 3:
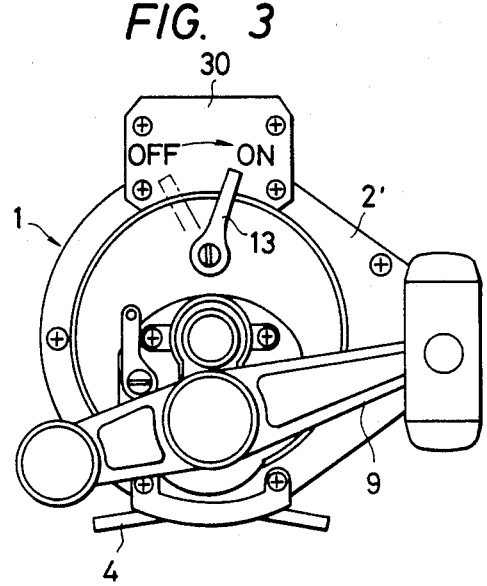
FIG. 3 is a side elevational view of the reel shown in FIG. 1.
Figure 4:
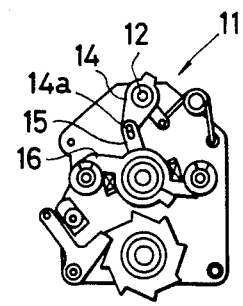
FIG. 4 is a side elevational view of a clutch mechanism in the reel.
Figure 5:
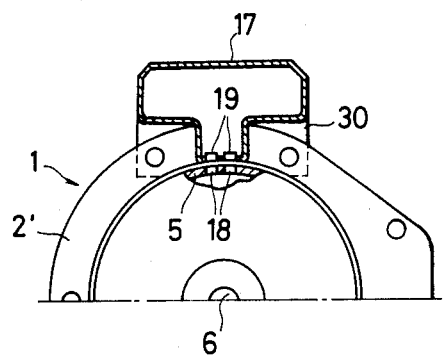
FIG. 5 is a side elevational view, partly in section, of the reel of FIG. 1.
Figure 6:
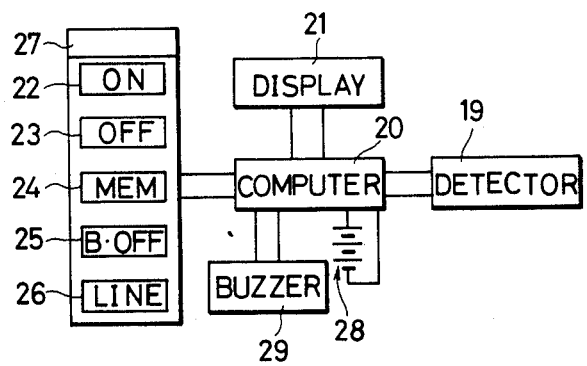
FIG. 6 is a block diagram for the water-depth measuring apparatus of the present invention.

Referring to FIGS. 1 to 4 of the drawings, a double bearing type fishing reel comprises a reel body 1 formed by a pair of side plates 2 and 2', a plurality of supporting bars 3, and a fishing rod support 4 provided therebetween. A spool 5 is supported rotatably on a spool shaft 6 extending between the side plates 2 and 2'. The spool shaft 6 has an oval portion 6a, and a pinion 7 has a complementary oval hole in which the oval portion 6a is fitted so that the pinion 7 may be axially slidable.

A handle 9 is connected to a ratchet shaft 8, and a master gear 10 is integrally provided on the ratchet shaft 8. If the handle 9 is turned, the master gear 10 is rotated and the pinion 7, which meshes with the master gear 10, is rotated to rotate the spool shaft 6 and the spool 5.

A clutch mechanism 11 is provided in the side plate 2'. It includes a clutch lever 13 supported rotatably by a clutch lever shaft 12 on the side plate 2'. An arm 14 is secured to the inner end of the clutch lever shaft 12, and has a pin 14a. If the lever 13 is rotated to the off position, a clutch cam 15 is rotated by the pin 14a, and causes a clutch bar 16 and the pinion 7 to slide along the spool shaft 6 to the right as viewed in FIG. 2. The pinion 7 is, therefore, disengaged from the oval portion 6a of the spool shaft 6, and the spool shaft 6 is disengaged from the ratchet shaft 8, so that the spool 5 may be rotated in either direction.

A water-depth measuring apparatus embodying the present invention comprises at least one magnetic element 18 embedded in the outer periphery of the spool 5, and various parts provided in a case 17 which is separate from the reel body 1.

The case 17 contains means for detecting the rotation speed of the element 18. As embodied herein, the detecting means comprises a detector 19 which detects the rotating speed of the element 18 and generates a corresponding signal.

Means are provided for calculating the cast length of the fishing line from the rotation speed of the element 18 and from reel and line information. As embodied herein, the calculating means comprises a computer 20 which calculates the signal received from the detector 19. A liquid crystal display device 21 is connected to the computer 20 for indicating the cast length of a fishing line.

Means are provided for entering and storing reel line data and control information. As embodied herein, the entering means comprises a keyboard 27 including a power supply ON key 22, a power supply OFF key 23, a memory set key 24, a buzzer OFF key 25, and a fishing line size set key 26.

The apparatus further includes a battery 28 and alarm means for indicating when a cast length has reached a predetermined length. As embodied herein, the indicating means comprises a buzzer 29.

The case 17 is removably connected to the reel body 1 by a mounting plate 30 and screws 31. The detector 19 faces the magnetic element 18 which is removably positioned on spool 5. The apparatus of this invention can, therefore, be attached to a double bearing type fishing reel having a different size if a mounting plate 30 having an appropriate size is employed.

The case 17 includes a projecting portion 17a having an end on which the detector 19 is provided so that it may face a path along which the magnetic element 18 lies when the spool 5 is rotated. A pair of such detectors 19 are provided for detecting the normal and reverse rotations, respectively, of the spool 5.

In operation, the power supply ON key 22 on the keyboard 27 is depressed and the fishing line size set key 26 is depressed to establish a selective display of the size of the fishing line on the spool 5 on the liquid crystal display device 21 or to enter changes in the amount of fishing line on the spool 5. If the clutch lever 13 is turned to its OFF position, the oval hole of the pinion 7 is disengaged from the oval portion 6a of the spool shaft 6 to enable the free rotation of the spool 5, as the weight of a sinker causes the fishing line to be unwound from the spool 5.

The rotation of the magnetic element 18 with the spool 5 is detected by the detector 19, and a signal representing its speed of rotation is transmitted to the computer 20. The computer 20 performs calculations based on various parameters depending on the type of the reel and the size of the fishing line, i.e., the diameter of the spool, the total amount of the fishing line wound on the spool, and the total rotating speed thereof. The computer 20 converts the results of the calculations to the cast length of the fishing line, and the liquid crystal display device 21 displays it as a numeral having a desired number of figures. Therefore, if:

N—total number of rotations of the spool
$L_n$—total amount of line wound on the spool
$L_x$—casting length after x rotations
$R_a$—maximum diameter of the spool
$R_b$—minimum diameter of the spool then, computer processing is based on the equation $L_x = F(R_a, R_b, N, \text{ and } L_n)$.

As the fishing line is cast, the liquid crystal display device 21 displays a number indicating that the fishing line has been cast to a predetermined depth. If the clutch lever 13 is turned to its ON position, the pinion 7 is engaged with the oval portion 6a of the spool shaft 6 to discontinue the rotation of the spool 5 and thereby any further casting of the fishing line. The number displayed on the device 21 is memorized if the memory set key 24 on the keyboard 27 is depressed.

The handle 9 is rotated to wind the fishing line on the spool 5. The spool shaft 6 and the spool 5 are rotated in a direction opposite to that in which they rotate when the fishing line is unwound. The rotating speed of the magnetic element 18 on the spool 5 is detected by the detector 19, and a signal representing it is transmitted to the computer 20. A number which is equal to the originally displayed number minus a number indicating the length of the fishing line to be wound on the spool 5 is gradually displayed on the liquid crystal display device 21. The device 21 indicates "O" if the fishing line is completely wound on the spool 5.

The clutch lever 13 is turned to its OFF position to cast the fishing line to a predetermined depth again. The fishing line is unwound by the weight of the sinker, and the spool 5 is rotated. The rotating speed of the magnetic element 18 is progressively detected by the detector 19, and the cast length of the line obtained by the calculations is displayed on the liquid crystal display device 21. The buzzer 29 sounds if the number displayed on the device 21 approaches the number stored by the memory set key 24. The buzzer 29 is so designed as to start sounding if the number displayed on the device 21 reaches a certain level close to the memorized number, and to make the loudest sound if it coincides with the memorized number. Therefore, both the display on the device 21 and the sound of the buzzer 29 indicate that the fishing line has been cast to a predetermined depth again.

While the salient features of the invention have been described with reference to the drawings, it should be understood that the preferred embodiment described herein is susceptible of modification and alteration without departing from the spirit and scope of the following claims.

What is claimed is:

1. A water-depth measuring apparatus for a fishing reel including a reel body in which a spool carrying a fishing line is rotatably supported, the apparatus comprising:
   a detectable element removably mounted on said sppol for rotation therewith; and
   a detachable cast-length calculator attachable to the reel, the cast-length calculator comprising:
      means for detecting a number of rotations and a speed of rotation of said detectable element on said spool;
      means for entering and storing reel and line information;
      means for calculating the cast length of the fishing line from said speed of rotation of said detectable element and said reel and line information; and
      display means for indicating when said cast length has reached a predetermined length.

2. The apparatus according to claim 1 wherein said detectable element comprises a magnet.

3. The apparatus according to claim 2 wherein said detecting means comprises a magnetic sensor positioned along the rotation path of said detectable element when said cast-length calculator is attached to the reel, said sensor for generating an output signal when said detectable element rotates past said sensor.

4. The apparatus according to claim 3 wherein said entering and storing means comprises:
   a keyboard; and
   a memory buffer coupled to said keyboard and said calculating means, said reel and line information being entered through said keyboard and stored in said memory buffer and including the size of the fishing line and the diameter of the reel.

5. The apparatus according to claim 4 wherein said calculating means comprises a programmed digital computer.

6. The apparatus according to claim 5 wherein said keyboard includes a memory set key for entering said predetermined cast length and wherein said entered predetermined cast length is stored in said memory buffer.

7. The apparatus according to claim 6 also including alarm means for indicating when the cast length of said fishing line has reached said predetermined cast length, wherein said alarm means comprises a buzzer, said buzzer being controlled by said computer to produce a sound when said calculated cast length is approximately equal to said stored predetermined cast length.

8. The apparatus according to claim 7 further including a display device for displaying said calculated cast length.

9. The apparatus according to claim 8 further including a case for enclosing said cast-length calculator, said case being removable from said reel and attachable to a different reel.

10. A water-depth measuring apparatus for a fishing reel including a reel body in which a spool carrying a fishing line is rotatably supported, the apparatus comprising:
    at least one removable detectable element provided on the spool for rotation therewith; and
    a detachable cast-length calculator comprising:
    a detector for sensing the rotation of said element and for generating a signal corresponding to a number of rotations of said element on said spool;
    a keyboard for inputting data and control signals, said keyboard including a power supply on key, a power supply off key, a fishing line size set key, a memory set for entering a predetermined cast length, and a buzzer off key;
    a computer receiving said signal and data inputted through said fishing line size set key for calculating the cast length of the fishing line;
    a display means for displaying said calculated cast length; and
    a buzzer for indicating when said calculated cast length is approximately equal to said predetermined cast length.

11. The apparatus according to claim 10 further including a case for enclosing said cast length calculator, said case being attachable to and detachable from the reel.

12. The apparatus according to claim 11 wherein said display comprises a liquid crystal display.

13. The apparatus according to claim 10 wherein said detectable element comprises a magnet and said detector comprises a magnetic sensor.

14. The apparatus according to claim 10 wherein said buzzer is controlled by said computer to sound when said calculated cast length is equal to said predetermined cast length.

* * * * *

UNITED STATES PATENT AND TRADEMARK OFFICE
CERTIFICATE OF CORRECTION

PATENT NO. : 4,620,371

DATED : November 4, 1986

INVENTOR(S) : Hideo Murakami and Haruo Uetsuki

It is certified that error appears in the above-identified patent and that said Letters Patent is hereby corrected as shown below:

Claim 1: Column 4; line 32; "sppol" should be --spool--.

Signed and Sealed this

Twenty-seventh Day of January, 1987

*Attest:*

DONALD J. QUIGG

*Attesting Officer*  *Commissioner of Patents and Trademarks*